Robb & Allison,
Seed Planter.
No. 85,854. Patented Jan. 12 1869.

Witnesses
Wm A Morgan
G. C. Cotton

Inventor:
J. S. Robb
S. P. Allison
per Munn & Co
Attorneys

JOHN S. ROBB AND SAMUEL P. ALLISON, OF NEW CUMBERLAND, WEST VIRGINIA.

Letters Patent No. 85,854, dated January 12, 1869.

IMPROVEMENT IN SEED-PLANTER.

The Schedule referred to in these Letters Patent and making part of the same.

*To all whom it may concern:*

Be it known that we, JOHN S. ROBB and SAMUEL P. ALLISON, of New Cumberland, in the county of Hancock, and State of West Virginia, have invented a new and useful Improvement in Seed-Planter; and we do hereby declare that the following is a full, clear, and exact description thereof, which will enable others skilled in the art to make and use the same, reference being had to the accompanying drawings, forming part of this specification.

Similar letters of reference indicate corresponding parts.

Our invention has for its object to furnish an improved machine designed especially for planting potatoes, but which shall be equally applicable for planting all other seeds requiring to be planted in hills or drills, and which shall be simple in construction and accurate in operation; and It consists in the construction and combination of the various parts as hereinafter more fully described.

A is the frame of the machine, which is securely attached to the axle B, upon the ends of which the wheels C revolve.

D are the seed-hoppers, which are attached to and supported by the side-plates E.

The forward ends of the side-plates E are extended into bars, the forward ends of which are pivoted to the forward part of the frame A.

To the rear ends of the side-plates E are pivoted the upper ends of the levers or connecting-bars F, the lower ends of which are pivoted to the rock-shaft G, by means of eye-bolts or short arms attached to said shaft.

H are short shafts, the ends of which work in bearings in the rear parts of the side-plates E.

To the outer ends of the shafts H are attached the gear-wheels I, the teeth of which mesh into the teeth of the gear-wheels J, attached to the inner ends of the hubs of the wheels C.

To the middle parts of the shafts H are attached dropping-wheels K, which enter and work in slots in the rear sides of the hoppers D, receive the seed, carry it up, and deposit it in the conducting-spouts, by which it is conducted to the ground.

For planting potatoes, the face of the wheels K should be provided with claws, which take hold of the potatoes so that they may be carried up by the revolution of the said wheels.

In the case of the smaller seeds, cavities should be formed in the faces of the wheels K, to receive and carry up a sufficient amount of seed to form a hill.

L is the conducting-spout, the upper part of which is attached to the rear side of the hoppers D, so as to encase the dropping-wheels K.

Figure 1:
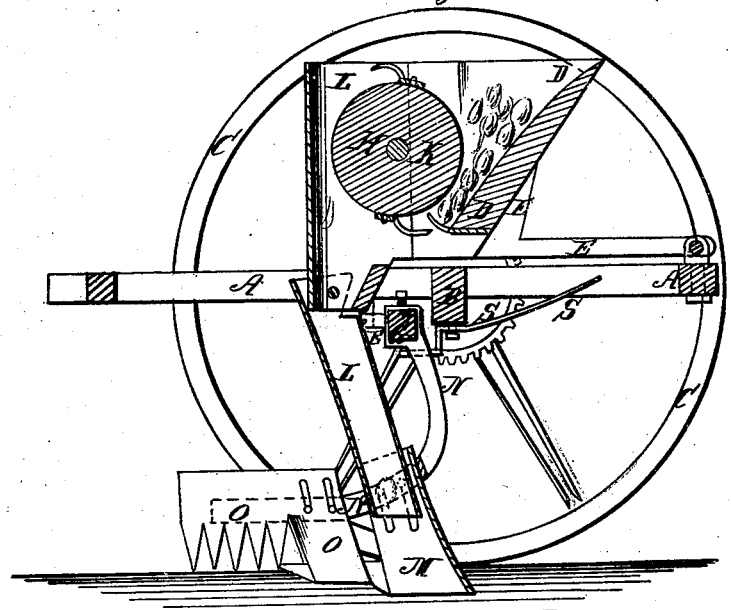
Figure 1 is a vertical longitudinal section of our improved machine, taken through the line x–x, fig. 2.
Figure 2:
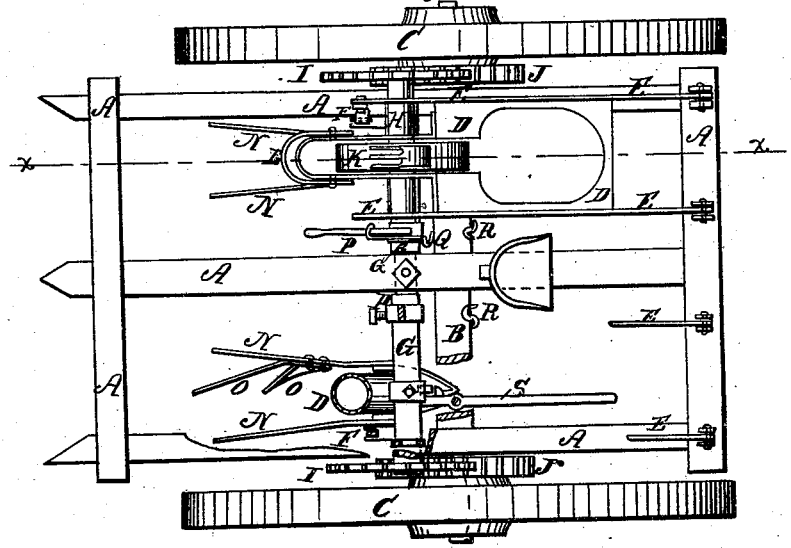
Figure 2 is a top view of the same, parts being broken away to show the construction.

The lower part of the spout is pivoted or jointed to the upper part, as shown in fig. 1, so that the lower end of said spout may be moved through a greater space than would be possible were the said parts rigidly connected or made in one piece.

M are the plows or cultivator-teeth, which open the furrows, and the sides or wings of which extend back upon each side of the lower end of the conducting-spout, so that the seed may be introduced into the bottom of the furrow before the earth has flowed in at the rear of the plow, and partially filled said furrow.

The plows M are adjustably attached to the forked lower ends of the bars or arms N, by bolts passing through slots in the said plows, and through holes in the arms of the said bar N.

The upper ends of the bars N are rigidly attached to the rock-shafts G.

O is the coverer, which is attached to the forked ends of the bars N, that project in the rear of the lower end of the conducting-spout L.

The forward part of the coverers O is so formed as to turn the sides of the furrow inward, covering the seed, and the rear part is toothed, as shown in fig. 1, to smooth off the top of the row, and rake off the clods, stones, &c., that might interfere with the growth of the plants.

The coverers O are adjustably attached to the arms of the bar N, by bolts passing through holes in the said arms and through slots in the said coverers, as shown in fig. 1.

P are levers, the lower ends of which are attached to the rock-shafts G, so that, by operating the said levers P, the plows M may be raised from the ground, the same movement raising the rear sides of the hoppers D, throwing the gear-wheels I out of gear with the gear-wheels J.

Q are hooks attached to the levers P, which, when the plows and hoppers are raised, may be hooked upon the catches R, so as to hold said parts raised for any desired length of time.

S are levers pivoted to the frame A of the machine, and the rear or lower ends of which have hooks formed upon them, which, when the plows M are in working-position, hook around the bars or arms N, to which said plows are attached, to hold said plows in position and support the draught-strain.

The forward ends of the levers S extend up into such a position that they may be reached by the driver from his seat, T, with his foot, to operate them.

We claim as new, and desire to secure by Letters Patent—

1. The combination of the plows M and forked arms N with the conducting-spouts L and rock-shafts G, substantially as herein shown and described, and for the purpose set forth.

2. The combination of the covers O with the forked arms N, conducting-spouts L, and plows M, substan tially as herein shown and described, and for the purpose set forth.

3. The combination of the lock-levers S with the arms N, rock-shafts G, and frame A, substantially as herein shown and described, and for the purpose set forth.

4. The combination of the pivoted plates E, rock-shaft G, connecting-bars E, and forked arms N, with the plows M, pivoted conducting-spout L, hopper D, gear-wheel I, and dropping-wheel K, all arranged and operating as described, for the purpose specified.

JOHN S. ROBB.
SAMUEL P. ALLISON.

Witnesses:
HENRY STONE,
A. STEWART.